United States Patent [19]

Kholer et al.

[11] Patent Number: 4,718,491

[45] Date of Patent: Jan. 12, 1988

[54] PROCESS FOR PREVENTING WATER INFLOW IN AN OIL- AND/OR GAS-PRODUCING WELL

[75] Inventors: Norbert Kholer, Saint Germain en Laye; René Tabary, Le Pecq; Alain Zaitoun, Rouen, all of France

[73] Assignee: Institut Francais du Petrole, Fueil-Malmaison, France

[21] Appl. No.: 901,804

[22] Filed: Aug. 29, 1986

[30] Foreign Application Priority Data

Aug. 29, 1985 [FR] France ............................. 85 12991

[51] Int. Cl.$^4$ ............................................. E21B 33/138
[52] U.S. Cl. .................................... 166/294; 166/246
[58] Field of Search ................. 166/246, 294; 405/264

[56] References Cited

U.S. PATENT DOCUMENTS

| | | | |
|---|---|---|---|
| 3,386,514 | 6/1968 | Weber | 166/306 |
| 3,779,315 | 12/1973 | Boneau | 166/294 X |
| 3,844,348 | 10/1974 | Stratton | 166/294 X |
| 4,039,029 | 8/1977 | Gall | 166/294 |
| 4,165,257 | 8/1979 | Stokke | 166/246 X |
| 4,466,889 | 8/1984 | Miller et al. | 166/246 X |
| 4,574,887 | 3/1986 | Abdo | 166/246 X |
| 4,599,180 | 7/1986 | Vio et al. | 536/114 X |
| 4,658,898 | 4/1987 | Paul et al. | 166/294 X |

*Primary Examiner*—George A. Suchfield
*Attorney, Agent, or Firm*—Antonelli, Terry & Wands

[57] ABSTRACT

The invention relates to a process for reducing or completely stopping a water inflow from a formation towards a producing well.

The process according to the invention, using the injection of an aqueous dispersion of hydrosoluble polysaccharide in this producing well, blocks the water inflow without however decreasing the oil and gas flow towards this well.

This process is particularly of high interest when the produced water is hot, e.g. at a temperature from 70° to 130° C., and/or salted, e.g. of a salt content of at least 30 g/l.

This process is used for oil and/or gas production.

8 Claims, No Drawings

PROCESS FOR PREVENTING WATER INFLOW IN AN OIL- AND/OR GAS-PRODUCING WELL

The present invention relates to a process for reducing or completely stopping a water inflow from a formation towards a producing well. This process, using the injection in the producing well of an aqueous dispersion of hydrosoluble polysaccharide, provides for the stopping of the water inflow without however decreasing the oil or gas flow towards this well. It is particularly of high interest when water is hot, e.g. at a temperature from 70° to 130° C. and/or salted, e.g. with a salt content of at least 30 g/l, expressed as NaCl.

BACKGROUND OF THE INVENTION

Water as brine often exists in the same formation as oil or gas. The development of oil- or gas-containing reservoirs simultaneously results in the production of water in such amount that it raises serious problems: formation of deposits at the vicinity of the well or in the tubing, increase of the corrosion of metal parts, formation of emulsions with oil which are very difficult to break. When offshore drillings are concerned, the water production in large amount raises, in addition, problems of storage and of discharge.

Many methods destined to reduce the water inflows in the production wells have been proposed and tested on the field. They generally consist of placing in the formation, at the water and oil or gas interface, a tight barrier consisting for example of cements, resins, suspensions of solid particles or of paraffins. These clogging agents have the disadvantage of blocking the oil or gas as well as the water inflow, particularly when the water inflow results from a water coning phenomenon.

More recently, it has been proposed to use hydrolyzed polyacrylamides. However, this type of polymer is efficient mainly against inflows of water of low salt content and has a decreasing activity with water of increased salt content. Moreover, by temperature effect, these polyacrylamides progressively hydrolyze and thus precipitate in the presence of plurivalent ions.

Another technique for preventing water inflows in producing wells uses the property of various polymers, poly-acrylamides and xanthan gums, to cross-link by action of salts of trivalent ions such as chromium and aluminum ions. It has been observed that this cross-linking to more or less compact gels results effectively in the stopping or reduction of the water inflow, but also affects to a large extent the oil or gas production.

SUMMARY OF THE INVENTION

The present invention has for object a process for reducing the water inflows in oil- and/or gas-producing wells without substantially decreasing the oil or gas production. This process consists of injecting an aqueous dispersion of polysaccharide in the formation surrounding the producing well, from said well, then bringing the well again in production and recovering the produced fluids. The process is characterized in that said aqueous dispersion of polysaccharide is injected at such a rate that the shear gradient, as measured at the input of the formation, is at least 50 sec.$^{-1}$ and is sufficient to reduce the viscosity of the injected polysaccharide aqueous dispersion by at least 50% with respect to the viscosity at a shear gradient of 1 sec.$^{-1}$.

Preferably, the injection is performed at a rate and/or at a pressure sufficient to provide for an easy introduction of the dispersion into the formation but at a pressure lower than the limit layer pressure of fracturing pressure.

By sufficient flow rate and/or pressure, it is meant a flow rate and/or pressure corresponding to a shear gradient of at least 50 sec.$^{-1}$. The viscosity of the polysaccharide solution at this gradient is preferably lower than 10 mPa.s, e.g. of 1–9 mPa.s (1 mPa.s = 1 cp).

Typically, a viscosity decrease of at least 50% with respect to the viscosity measured at a shear gradient of 1 sec.$^{-1}$ is preferred. The shear gradient is defined as $\dot{\gamma} = 4v/r$ wherein v is the linear velocity of displacement in cm/sec. at the field input, $v = q/S\phi$ wherein q is the flow rate in cc/sec.; S is the surface in cm$^2$, r is the average pore radius $= (8k/\phi)^{1/2}$ expressed in centimeters, wherein k is the reservoir permeability in cm$^2$ (1 cm$^2$ = 10$^8$ Darcys) $\phi$ is the porosity expressed in %. Remark: units are in CGS.

Examples of convenient polysaccharides for the purpose of the invention are non ionic polysaccharides such as glucanes and particularly scleroglucane as well as anionic polysaccharides, for example xanthan gums.

Non negligible advantages of the use of these polysaccharides in conformity with the present process, as compared with polyacrylamides and their copolymers, consist in their lower sensitivity to mechanical degradation resulting from the use of high strains, essentially in the well vicinity, and in their higher compatibility with salted waters and in the fact that they are not subjected, by temperature effect, to a hydrolysis reaction which affects the stability of polyacrylamides.

As polysaccharides, scleroglucane appears to be the more active. The polymer concentration in aqueous dispersion depends, on the one hand, on the viscosity that it develops and, on the other hand, on its clogging property. The useful concentrations are most often from 200 to 5000 ppm by weight of polymer and preferably from 500 to 3000 ppm, more particularly from 500 to 2000 ppm.

The convenient temperatures for the use of polysaccharides are in the range from room temperature to 130° C. As already set forth, it is of particular interest to use them at temperatures from 70° to 130° C. and/or with salt contents of at least 30 g/l.

EXAMPLES

The following examples are given to illustrate the invention but must not be considered as limiting the scope thereof.

These examples concern tests representative of water inflows in a well. These tests consist of simulating in laboratory, on cores from consolidated or unconsolidated reservoirs, the use of the polymer solution at different injection flow rates and of subsequently injecting, in an opposite direction, the produced fluids, i.e, particularly, water and oil. Having previously determined the initial permeabilities of said cores, respectively to water and to oil, this operating manner makes it possible to estimate the final permeabilities for the same fluids after introduction of the polymer and hence to deduce therefrom values of permeability reduction. By definition, if the initial and final permeabilities are identical, this permeability reduction is equal to 1.

EXAMPLE 1

In a cylinder of stainless steel of 30 cm length and 4 cm diameter, an unconsolidated porous medium is reconstituted by packing raw Entraigues sand. The permeability of this porous medium is measured by injecting reconstituted sea water (30 g/l of NaCl and 3 g/l of CaCl$_2$, 2H$_2$O) at variable flow rates ranging from 100 to 350 cc/h, which corresponds to shear gradients ranging from 29 to 102 sec$^{-1}$, and measuring the pressure drops at these flow rates at the limits of the porous medium. By application of the Darcy law, the permeability to water of this porous medium is determined as constant at all the flow rates and equal to 3.24 Darcys, the porosity $\phi$ being 44%.

On the other hand, in the same sea water, a dispersion containing 1 g/liter (1000 ppm) of scleroglucane powder is prepared and, with a low gradient viscosimeter, the rheologic curve of the obtained polysaccharide solution is plotted. The so-determined relative viscosities versus the shear gradient are respectively 300 mPa.s (centipoises) at 1 sec$^{-1}$ and 7 mPa.s at 100 sec.$^{-1}$.

This scleroglucane solution is injected in the direction from A towards B through the sand block at a rate of 350 cc/h, corresponding to a shear gradient ($\overset{\circ}{Y}$) of 101.85 sec$^{-1}$. and it is observed that the pressure drops between the input and the output of the sand block as well as the viscosities quickly equilibrate and keep the same value up to the end of the injection (relative pressure drop R$_m$=12, viscosity decrease=0%).

After injection of eight times the pore volume of polysaccharide solution, the polymer injection is discontinued and sea water is injected at the same flow rate of 350 cc/h ($\overset{\circ}{Y}$=101.85 sec.$^{-1}$), in the direction B→A, thus simulating a water inflow from the reservoir towards the well. After total displacement of the polymer non irreversibly retained in the porous medium, followed by the measurement of the effluents viscosity, a new value of the permeability to sea water is determined. It is thus observed that the so-measured permeability is 4.3 times lower than the initial permeability in the absence of polymer. The permeability reduction (R$_k$) at this flow rate is hence 4.3, which value is used as reference.

Still in the direction from B towards A, the sea water injection is continued, but however with progressive decrease of the flow rate to 100 cc/h. By measuring the corresponding pressure drops at the limits of the sand block, it is observed that the obtained permeabilities decrease with the flow rate (and with the shear gradient) and consequently, that the permeability reductions (R$_k$) increase. This evolution characterizes the clogging effect resulting from the presence of polymer trapped inside the block. It must be recalled that, in absence of polymer, the measured permeabilities are independent from the sea water injection rate.

Table I summarizes the results of the permeability reduction (R$_k$) obtained on this block for different sea water production rates (q) and hence for different shear gradients ($\overset{\circ}{Y}$).

TABLE I

| Effect of soleroglucane injection in unconsolidated medium at high gradient ($\gamma$ = 101.85 sec.$^{-1}$) on water production. | | | |
|---|---|---|---|
| q in cm$^3$/h | $\gamma$ in sec. | R$_k$ Sea water | |
| 350 | 101.85 | 4.31 | After injection of |
| 300 | 87.35 | 4.41 | 1000 ppm of polymer |
| 250 | 72.75 | 4.58 | |
| 200 | 58.2 | 4.98 | |
| 150 | 43.65 | 5.32 | |
| 100 | 29.1 | 6.05 | |
| 350 | 101.85 | 1 | Without polymer |

Sceleroglucane injection in an unconsolidated sand block provides for a reduced water permeability and hence limits the water inflow.

EXAMPLE 2

This example has for object to show, in contrast with the invention, that, when the flow rate of injected polysaccharide is insufficient, the polymer becomes clogging and the relative pressure drops at the ends of the core (Rm) progressively increase.

A dispersion of 1000 ppm of scleroglucane powder in sea water, identical to that of example 1, is injected at a rate of q=20 cc/h (Y=5.8 sec.$^{-1}$) in an unconsolidated block of Entraigues sand identical to that of example 1 (length: 30 cm, diameter: 4 cm) whose permeability to sea water is 3.24 Darcys. The viscosities of the scleroglucane solution are respectively 300 mPa.s at 1 sec.$^{-1}$ and 210 mPa.s at 5.8 sec.$^{-1}$ gradient. The operation is conducted as in example 1 and the pressure drops are measured between the input and the output of the porous medium (Table II); it is observed that these pressure drops progressively increase during the injection and that no stabilization is achieved after injection of 5.8 pore volumes.

Moreover, the effluent viscosity drops during the injection, thus showing a progressive clogging of the porous medium by the polymer solution.

TABLE II

| Effect of the injection at low gradient ($\gamma$ = 5.8 sec.$^{-1}$) of a scleroglucane solution in unconsolidated medium. | | |
|---|---|---|
| Injected pore volumes | Relative pressure drops (Rm) | Viscosity decrease in % |
| 0 | 1 | 0 |
| 0.5 | 7 | 1.2 |
| 3.4 | 94 | 3.3 |
| 5.2 | 279 | 4.8 |
| 5.8 | 517 | 8 |

EXAMPLE 3

Example 1 is repeated, except for the use of a clayish consolidated sandstone (Vosges sandstone) of a 8 cm length and 4 cm diameter, inserted in a Hassler cell.

By sea water injection at different flow rates, it is possible to determine the permeability of said core, which was found equal to 2.36 Darcys and its porosity $\phi$=21.8%.

Then a solution of scleroglucane powder at 1000 ppm in sea water is injected in the core in the direction from A to B at a rate of 200 cc/h, which corresponds to a shear gradient of 87 sec.$^{-1}$ and to a viscosity of 8 mPa.s. It must be observed that the viscosity for $\overset{\circ}{Y}$=1 sec.$^{-1}$ is 300 mPa.s. After injection of 24.2 pore volumes of the polymer solution, 200 cc/h of sea water are injected at the same rate in the opposite direction (direction from B to A) up to complete displacement of the untrapped polymer. At this flow rate, the permeability is determined and it is observed that the initial permeability is reduced by a factor of 5.84. By measuring the pressure drops at decreasing sea water flow rates, it is observed, as in example 1, that the permeabilities to sea water decrease with the flow rate and hence that the permeability reductions increase. Table III summarizes the main relevant results.

TABLE III

Effect of scleroglucane injection in consolidated medium at high gradient ($\gamma = 87.2$ sec.$^{-1}$) on water production

| q in cm$^3$/h | $\gamma$ in sec.$^{-1}$ | $R_k$ Sea water | |
|---|---|---|---|
| 200 | 87.2 | 5.84 | After injection of |
| 100 | 43.6 | 6.67 | 1000 ppm of polymer |
| 50 | 21.8 | 7.49 | |
| 35 | 15.26 | 7.91 | |
| 25 | 10.9 | 8.90 | |
| 15 | 6.54 | 9.59 | |
| 200 | 87.2 | 1 | Without polymer |

The introduction of scleroglucane in the block of Vosges sandstone hence effectively reduces the permeability of this block to sea water and accordingly decreases the water production.

EXAMPLE 4

An experiment similar to that of example 1 has been performed with an unconsolidated block of Entraigues sand in order to ascertain the effect of introduction of a polysaccharide solution simultaneously on the permeabilities to water and to oil.

The permeability of the sample is first measured by injecting reconstituted sea water at variable flow rates ranging from 10 to 90 cc/h and, by measuring the pressure drops at these flow rates, the initial permeability to sea water is deduced therefrom. It is equal to 3.68 Darcys.

Similarly a refined oil is injected at various flow rates in the same sample of porous medium and the deduced permeability to oil equals 3.86 Darcys.

A second sea water injection is performed at various flow rates and the deduced permeability to water in the presence of residual oil equals 0.879 Darcys, the saturation with residual oil being equal to 24%. At this time, the porous medium is in the same conditions as a reservoir simultaneously producing water and oil.

The polymer is introduced in the same manner as in example 1, but at a different rate, i.e. by injection in the direction from A to B, at a rate of 90 cc/h, corresponding to a shear gradient of 88.47 sec.$^{-1}$*, of a sea water solution at 1 g/liter of scleroglucane, initially as powder. The pressure drops at the limits of the block are quickly stabilized and the viscosities between the input and th output of the block are constant. 30 pore volumes of polymer solution have been introduced.

*(measured viscosity at this gradient: 8 mPa.s). The viscosity was 300 mPa.s for a gradient of 1 sec.$^{-1}$.

The polymer excess is displaced by injecting, in the direction from B to A, sea water at a rate of 90 cc/h, until the effluents are free of polymer. Oil is then directly injected at various flow rates in the direction from B to A and the pressure drops are measured at these flow rates. It is observed that the initial permeability to oil is maintained. Hence the permeability to oil is not reduced.

Then permeabilities to sea water in the presence of residual oil are measured by injection of sea water at variable flow rates, still in the direction from B to A, and it is observed that the initial permeability to water of 0.879 Darcys is no longer maintained, the permeability value being the lower as the flow rate decreases. As precedingly, the reduction of permeability to sea water in the presence of residual oil increases when the flow rate of injected water decreases.

The main results are reported in Table IV.

The introduction of scleroglucane in porous medium hence reduces the permeability to water of this porous medium and accordingly the water production, but does not change in any way the permeability to oil and hence the oil production.

TABLE IV

Effect of scleroglucane injection in unconsolidated medium at high gradient (88.47 sec.$^{-1}$), on water and oil production.

| q in cm$^3$/h | $\gamma$ in sec.$^{-1}$ | $R_k$ oil | $R_k$ Sea water | |
|---|---|---|---|---|
| 90 | 88.47 | 1.00 | — | Without |
| 90 | 88.47 | — | 1.00 | polymer |
| 90 | 88.47 | 1.00 | 5.40 | After injec- |
| 50 | 49.18 | 1.00 | 6.40 | tion of 1000 ppm |
| 30 | 29.49 | 1.00 | 8.66 | of polymer |
| 20 | 19.66 | — | 9.95 | |
| 15 | 14.75 | 1.00 | 10.91 | |
| 10 | 9.83 | — | 13.6 | |

EXAMPLE 5

An experiment similar to that of example 1 has been achieved at 80° C. in order to test the influence of the temperature on the reduction of permeability to sea water in the presence and in the absence of polymer.

The permeability to sea water of the unconsolidated block of Entraigues sand has been found equal to 2.50 Darcys, independently of the water injection rate, and the porosity $\phi = 44\%$.

A dispersion at 500 mg/liter of scleroglucane powder in sea water is injected at a rate of 350 cc/h, corresponding to a shear gradient of 93.45 sec.$^{-1}$*. After displacement of the polymer excess by sea water, the sea water injection rate is varied as precedingly and it is observed that the permeability decreases with the flow rate (Table V).

*The measured viscosity at said gradient is about 4 mPa.s as compared with 80 mPa.s at 1 sec.$^{-1}$.

It is observed that, at 80° C., the polymer introduction makes it possible to reduce, as an average, the permeability by a factor of 2 with only one half of the polymer amount.

TABLE V

Effect of scleroglucane injection in unconsolidated medium at 80° C. ($\gamma = 93.45$ sec.$^{-1}$) on water production.

| q in cm$^3$/h | $\gamma$ in sec.$^{-1}$ | $R_k$ Sea water | |
|---|---|---|---|
| 350 | 93.45 | 1.00 | Without polymer |
| 350 | 93.45 | 1.78 | In the presence of |
| 300 | 80.1 | 1.81 | 500 ppm of polymer |
| 250 | 66.7 | 1.85 | |
| 200 | 53.4 | 1.98 | |
| 100 | 40.05 | 2.19 | |
| 50 | 26.7 | 2.42 | |

EXAMPLE 6

The purpose of this example is to show that the invention is not limited to only scleroglucane, but may also use other polysaccharides such, for example, as xanthan gums.

From xanthan gum powder of the grade used for enhanced oil recovery, a dispersion at 2.5 g/l in sea water is prepared. The obtained turbid solution is made limpid by enzymatic treatment forming no part of the invention. The rheologic curve of the obtained limpid solution is determined by means of a low gradient viscosimeter. The measured viscosities are respectively 440 mPa.s for a shear gradient of 1 sec.$^{-1}$ and 8.9 L mPa.s for 86.94 sec$^{-1}$.

The porous medium is a Vosges sandstone whose permeability to sea water was found equal to 1.84 Darcys at 30° C., independently of the sea water injection rate, and whose porosity is $\phi=22.7\%$.

The xanthan gum solution at 2500 ppm in sea water is injected at a constant rate of 180 cc/h, which corresponds to a shear gradient of 86.94 sec.$^{-1}$. After stabilization of the pressure drops at the ends of the sandstone core and after equilibration of the viscosities, the sea water injection is performed as precedingly in a direction opposite to that of polymer injection, up to complete displacement of the latter. Then, by varying the water injection rate, it is observed that the initial permeability is reduced by the presence of polymer trapped and absorbed in porous medium. The obtained values of permeability reduction are however lower than for scleroglucane but, as for this latter, these values increase when the sea water production decreases.

The results of Table VI show that it is possible to reduce the water inflows by using concentrated solutions of xanthan gum.

TABLE VI

Effect of xanthan gum injection in consolidated medium at 30° C.($\gamma = 86.94$ sec.$^{-1}$) on water production.

| q in cm$^3$/h | $\gamma$ in sec.$^{-1}$ | $R_k$ Sea water | |
|---|---|---|---|
| 180 | 86.94 | 1.0 | Without polymer |
| 180 | 86.94 | 1.44 | In the presence |
| 90 | 43.47 | 1.57 | of 2500 ppm of |
| 60 | 28.98 | 1.62 | polymer |
| 40 | 19.32 | 1.65 | |
| 20 | 9.66 | 1.73 | |

When applying the process of example 4 to the above-mentioned Vosges sandstone, i.e. when repeating the experiment of example 6 in the presence of oil, it is observed, as in example 4, that the permeability to water is reduced without changing the permeability to oil.

What is claimed as the invention is:

1. A process for preventing water inflow in an oil- and/or gas-producing well, wherein an aqueous dispersion of a polysaccharide is injected in the formation surrounding the producing well, from said well, and then the well is brought again in production and the produced fluids are recovered, characterized in that said aqueous dispersion of polysaccharide is injected at a polysaccharide concentration of 200 to 5000 parts per million of parts by weight and at such a rate that the shear gradient, measured at the input of the formation, is at least 50 sec.$^{-1}$ and the viscosity of said dispersion is lower than 10 mPa.s.

2. A process according to claim 1, characterized in that the polysaccharide is a scleroglucane.

3. A process according to claim 1, wherein the polysaccharide concentration is from 500 to 2000 parts per million of parts by weight.

4. A process according to claim 1, characterized in that production of the well performed at a field water flow rate and/or pressure equal to or lower than that previously used for the injection of the aqueous dispersion.

5. A process according to claim 1, applied to a formation containing water is at a temperature from 70° to 130° C.

6. A process according to claim 1, applied to a formation containing water having a salt content of at least 30 g/l, expressed as NaCl.

7. A process according to claim 1, characterized by a viscosity of the aqueous dispersion of polysaccharide from 1 to 9 mPa.s.

8. A process according to claim 1, wherein the polysaccharide is a xanthan gum.

* * * * *